(12) United States Patent
Sanghvi et al.

(10) Patent No.: US 12,050,929 B2
(45) Date of Patent: *Jul. 30, 2024

(54) SCHEDULING OF EXTERNAL BLOCK BASED DATA PROCESSING TASKS ON A HARDWARE THREAD SCHEDULER BASED ON PROCESSING ORDER

(71) Applicant: Texas Instruments Incorporated, Dallas, TX (US)

(72) Inventors: Hetul Sanghvi, Richardson, TX (US); Niraj Nandan, Plano, TX (US); Mihir Narendra Mody, Bangalore (IN); Kedar Satish Chitnis, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/123,653

(22) Filed: Dec. 16, 2020

(65) Prior Publication Data

US 2021/0103465 A1    Apr. 8, 2021

Related U.S. Application Data

(63) Continuation of application No. 15/396,172, filed on Dec. 30, 2016, now Pat. No. 10,908,946.

(51) Int. Cl.
*G06F 9/48* (2006.01)
*G06F 9/50* (2006.01)

(52) U.S. Cl.
CPC .......... *G06F 9/4812* (2013.01); *G06F 9/5027* (2013.01); *G06F 2209/5018* (2013.01)

(58) Field of Classification Search
None
See application file for complete search history.

(56) References Cited

U.S. PATENT DOCUMENTS 5,809,309 A * 9/1998 Leach ................... G06F 9/4812
712/E9.028
7,237,055 B1 * 6/2007 Rupp .................. G06F 13/4022
710/317

(Continued)

OTHER PUBLICATIONS

Mihir Narendra Mody et al, "Down Scaling Images in a Computer Vision System", U.S. Appl. No. 15/143,491, filed Apr. 29, 2016, pp. 1-33.

(Continued)

*Primary Examiner* — Meng Ai T An
*Assistant Examiner* — Zujia Xu
(74) *Attorney, Agent, or Firm* — Michael T. Gabrik; Frank D. Cimino

(57) ABSTRACT

A data processing device is provided that includes a plurality of hardware data processing nodes, wherein each hardware data processing node performs a task, and a hardware thread scheduler including a plurality of hardware task schedulers configured to control execution of a respective task on a respective hardware data processing node of the plurality of hardware data processing nodes, and a proxy hardware task scheduler coupled to a data processing node external to the data processing device, wherein the proxy hardware task scheduler is configured to control execution of a task by the external data processing device, wherein the hardware thread scheduler is configurable to execute a thread of tasks, the tasks including the task controlled by the proxy hardware task scheduler and a first task controlled by a first hardware task scheduler of the plurality of hardware task schedulers.

20 Claims, 8 Drawing Sheets

(56) References Cited

U.S. PATENT DOCUMENTS

| | | |
|---|---|---|
| 8,738,860 B1 | 5/2014 | Griffin |
| 9,870,266 B2 | 1/2018 | George |
| 2004/0019514 A1 | 1/2004 | Verbeke |
| 2004/0120321 A1 | 6/2004 | Han |
| 2004/0268096 A1 | 12/2004 | Master |
| 2006/0120379 A1* | 6/2006 | Beshai .................. H04L 49/101 370/412 |
| 2009/0310685 A1 | 12/2009 | Schmidt |
| 2010/0088703 A1 | 4/2010 | Whitfield |
| 2013/0055276 A1 | 2/2013 | Park |
| 2013/0067133 A1* | 3/2013 | Mansell ................ G06F 9/4806 710/267 |
| 2014/0160138 A1* | 6/2014 | Nalluri ................... G09G 5/001 345/541 |
| 2014/0372810 A1 | 12/2014 | Na |
| 2015/0312335 A1 | 10/2015 | Ying |
| 2016/0139622 A1 | 5/2016 | Barner |
| 2016/0139942 A1 | 5/2016 | Tsirkin |
| 2016/0180487 A1 | 6/2016 | Trawczynski |
| 2016/0306553 A1* | 10/2016 | Ellis ........................ G06F 12/02 |
| 2018/0081715 A1 | 3/2018 | LeBeane |
| 2018/0167435 A1 | 6/2018 | Kinarti |

OTHER PUBLICATIONS

Niraj Nandan et al, "Data Synchronization for Image and Vision Processing Blocks Using Pattern Adapters", U.S. Appl. No. 15/269,957, filed Sep. 19, 2016, pp. 1-40.

Nimar S. Arora, et al, "Thread Scheduling for Multiprogrammed Multiprocessors", Proceedings of the Tenth Annual ACM Symposium on Parallel Algorithms and Architectures (SPAA), Puerto Vallarta, Mexico, Jun. 1998, pp. 1-11.

Hannes Estl, "Paving the Way to Self-Driving Cars with Advanced Driver Assistance Systems", Texas Instruments, Inc., SSZY019, Aug. 2015, pp. 1-9.

Roman Staszewski and Hannes Estl, "Making Cars Safer Through Technology Innovation", Texas Instruments, Inc., SSZY009, Oct. 2013, pp. 1-8.

* cited by examiner

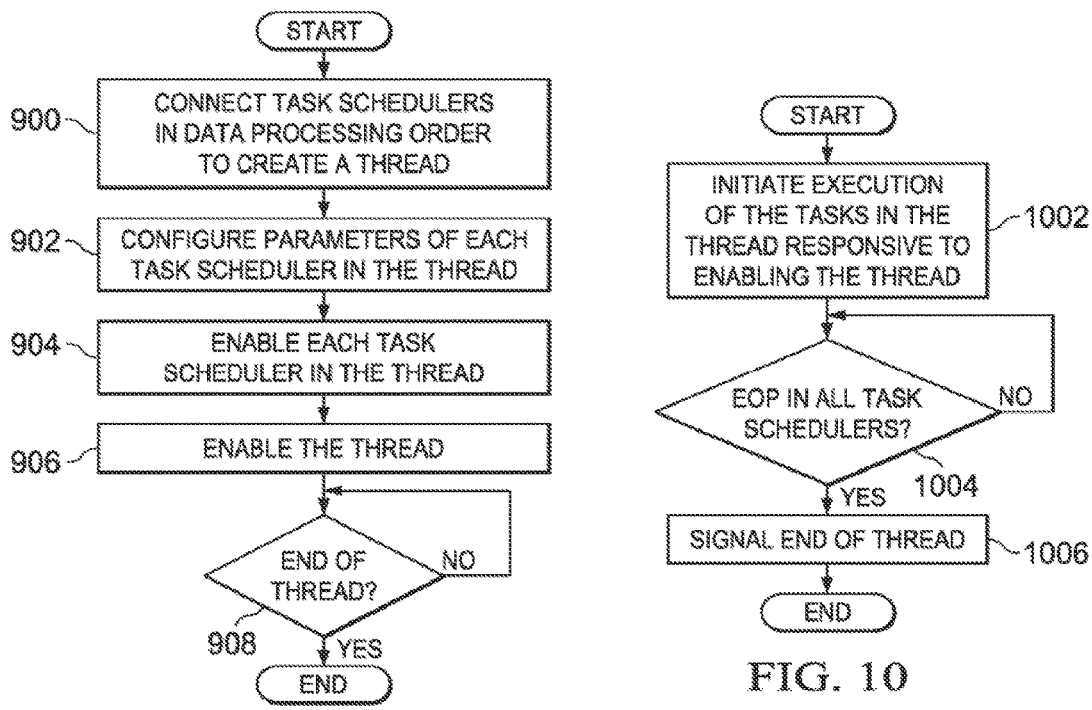
FIG. 9
FIG. 10
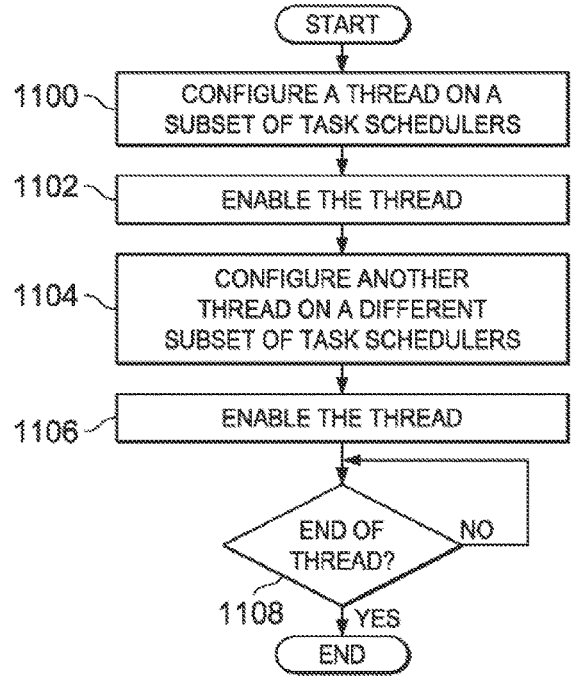
FIG. 11

SCHEDULING OF EXTERNAL BLOCK BASED DATA PROCESSING TASKS ON A HARDWARE THREAD SCHEDULER BASED ON PROCESSING ORDER

CROSS-REFERENCE TO RELATED APPLICATIONS

This application is a continuation of U.S. patent application Ser. No. 15/396,172, filed Dec. 30, 2016, and is incorporated herein by reference in its entirety.

BACKGROUND OF THE DISCLOSURE

Field of the Disclosure

Embodiments of the present disclosure generally relate to block based data processing systems, and more specifically relate to scheduling of block based data processing tasks on a hardware thread scheduler in such systems.

Description of the Related Art

A new class of embedded safety systems, referred to as advanced driver assistance systems (ADAS), has been introduced into automobiles to reduce human operation error. Such systems may provide functionality such as rear-view facing cameras, electronic stability control, and vision-based pedestrian detection systems. Many of these systems rely on computer vision processing of images captured by one or more cameras to detect objects in the field of view of the one or more cameras. The vision processing may include, for example, image processing, lens distortion correction, noise filtering, edge detection, motion detection, image scaling, etc.

Tasks implementing various parts of the vision processing of the images may be performed on hardware accelerators and/or by software executing on programmable processors, e.g., digital signal processors and general purpose processors. Current hardware thread schedulers provide for scheduling of a single thread of tasks to be executed on hardware accelerators but do not provide the flexibility needed for image and vision processing in ADAS.

SUMMARY

Embodiments of the present disclosure relate to methods and apparatus for scheduling of external block based data processing tasks on a hardware thread scheduler. In one aspect, a data processing device is provided that includes a plurality of hardware data processing nodes, wherein each hardware data processing node performs a task, and a hardware thread scheduler including a plurality of hardware task schedulers configured to control execution of a respective task on a respective hardware data processing node of the plurality of hardware data processing nodes, and a proxy hardware task scheduler coupled to a data processing node external to the data processing device, wherein the proxy hardware task scheduler is configured to control execution of a task by the external data processing device, wherein the hardware thread scheduler is configurable to execute a thread of tasks, the tasks including the task controlled by the proxy hardware task scheduler and a first task controlled by a first hardware task scheduler of the plurality of hardware task schedulers.

In one aspect, a method for executing a thread on a hardware thread scheduler included in a data processing device, the method including configuring a thread on the hardware thread scheduler, wherein the thread includes tasks of a subset of hardware data processing nodes included in the data processing device, and a task of a data processing node external to the data processing device, and initiating execution of the thread by the hardware thread scheduler.

BRIEF DESCRIPTION OF THE DRAWINGS

Particular embodiments will now be described, by way of example only, and with reference to the accompanying drawings:

FIG. 9 is a flow diagram of a method for configuring and executing a thread of tasks on a hardware thread scheduler;

FIG. 10 is a flow diagram of a method for executing a configured thread of tasks on a hardware thread scheduler; and FIG. 11 is a flow diagram of a method for executing concurrent threads on a hardware thread scheduler.

DETAILED DESCRIPTION OF EMBODIMENTS OF THE DISCLOSURE

Figure 1:
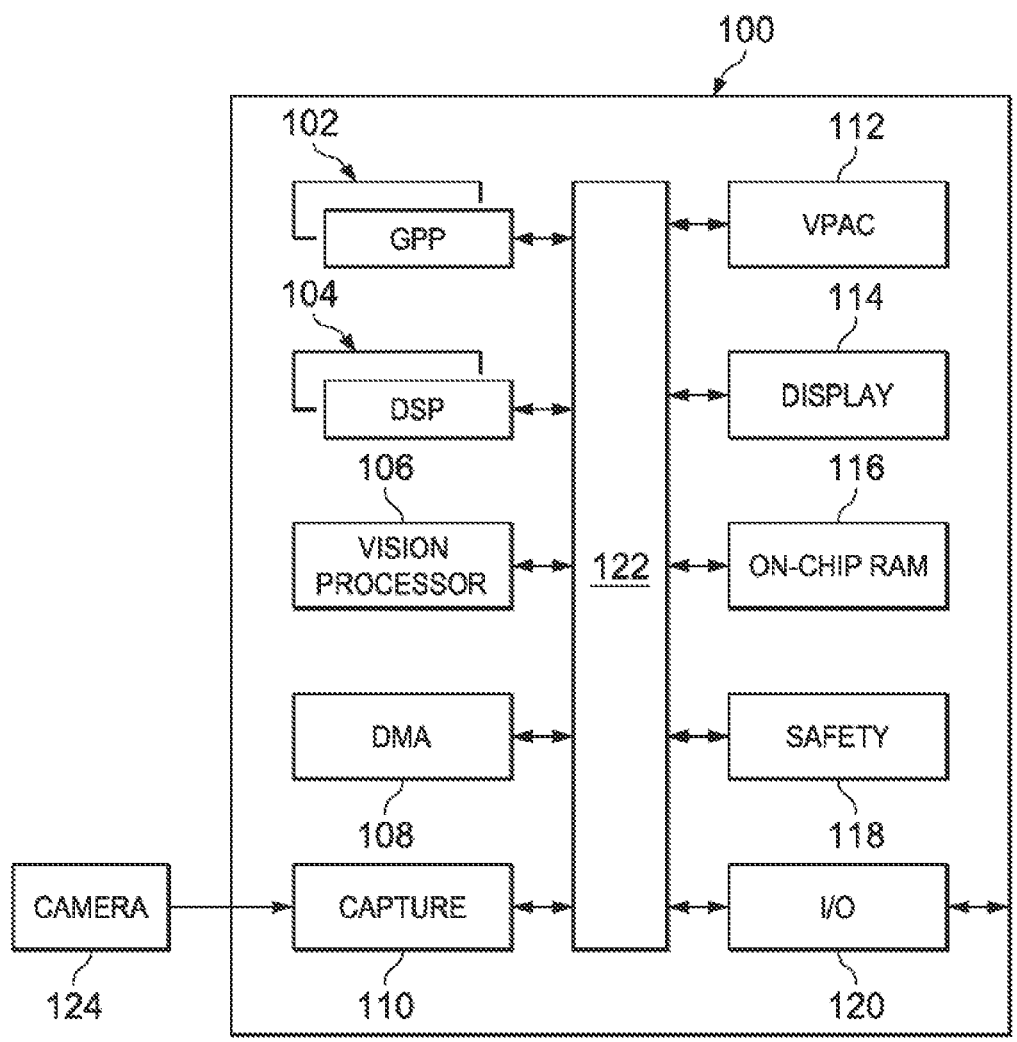
FIG. 1 is a high level block diagram of an example multiprocessor system-on-a-chip (SOC)

Specific embodiments of the disclosure will now be described in detail with reference to the accompanying figures. Like elements in the various figures are denoted by like reference numerals for consistency.

Embodiments of the disclosure provide for flexible scheduling of tasks in an embedded computer vision system having multiple hardware accelerators. More specifically, a software configurable hardware thread scheduler (HTS) for such an embedded computer vision system is provided. In some embodiments, the HTS includes functionality to manage execution of a thread including one or more tasks performed on hardware accelerators and one or more tasks performed in software. In some embodiments, the HTS may be configured to manage execution of concurrent threads.

FIG. 1 is a high level block diagram of an example multiprocessor system-on-a-chip (SOC) 100 configured to support computer vision processing in a camera-based ADAS. The SOC 100 includes dual general purpose processors (GPP) 102, dual digital signal processors (DSP) 104, a vision processor 106, and a vision preprocessing accelerator (VPAC) 112 coupled via a high speed interconnect 122. As is explained in more detail in reference to FIG. 2, the VPAC 112 includes several hardware accelerators configured to perform various pre-processing operations on incoming camera images. The vision processor 106 is a vector processor tuned for computer vision processing such as gradient computation, orientation binning, histogram normalization, etc. Such computer vision processing may use the preprocessed output of the VPAC 112. The GPP 102 hosts the operating system and provides overall control of the operation of the SOC 100 including scheduling of the preprocessing tasks performed by the VPAC 112. The DSP 104 provides support for computer vision processing such as object detection and classification.

The SOC 100 further includes a direct memory access (DMA) component 108, a camera capture component 110 coupled to a camera 124, a display management component 114, on-chip random access (RAM) memory 116, e.g., a computer readable medium, and various input/output (I/O) peripherals 120 all coupled to the processors and the VPAC 112 via the interconnect 122. In addition, the SOC 100 includes a safety component 118 that includes safety related functionality to enable compliance with automotive safety requirements. Such functionality may include support for CRC (cyclic redundancy check) of data, clock comparator for drift detection, error signaling, windowed watch-dog timer, and self testing of the SOC for damage and failures.

Figure 2:
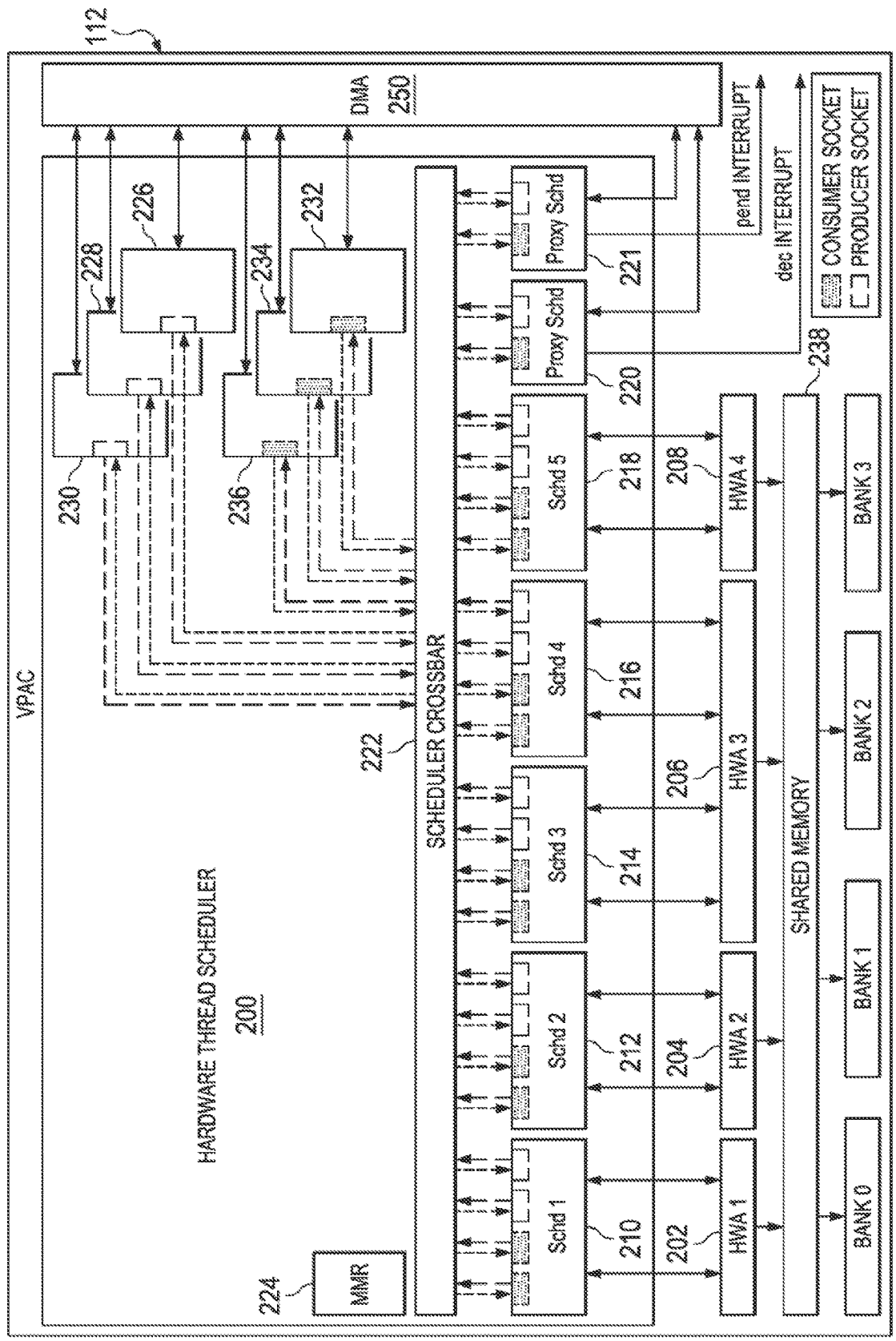
FIG. 2 is high level block diagram of an example vision preprocessing accelerator of the SOC of FIG. 1.

FIG. 2 is a high level block diagram of an example VPAC 112. The VPAC 112 includes four hardware accelerators 202-208 connected to a hardware thread scheduler 200 and to shared memory 238. Four hardware accelerators are shown for simplicity of explanation. One of ordinary skill in the art will understand embodiments having more or fewer accelerators. The hardware accelerators may be, for example, a lens distortion correction accelerator, an image scaling accelerator, a noise filter, and a vision specific image processing accelerator. Blocks of storage area in the shared memory 238 may be designated as buffers for blocks of data being processed by the hardware accelerators 202-208.

The hardware thread scheduler 200 is also connected to six channels of the DMA 250. Six DMA channels are shown for simplicity of explanation. One of ordinary skill in the art will understand embodiments in which the hardware thread scheduler is connected to more or fewer DMA channels. The DMA channels may be programmed to move blocks of data between the shared memory 238 and external memory, e.g., RAM 116.

The hardware thread scheduler 200 is configurable to schedule the execution of a single thread of tasks or multiple concurrent threads of tasks by nodes of the VPAC 112. A thread, which may also be referred to as a pipeline, is one or more tasks. A task is a particular function performed by a node and a node performs a single task. A node may be, for example, a hardware accelerator configured to perform a single task, a portion of a hardware accelerator configured to perform a task, a channel of the DMA 250, or software implementing a task on a processor external to the VPAC 112, e.g., the DSP 104. Further, the execution of a task on a node is managed by a hardware task scheduler in the hardware thread scheduler dedicated to the node/task.

Examples of hardware accelerators configured to perform a single task are a noise filtering accelerator and a lens distortion correction accelerator. An example of a hardware accelerator in which a portion may be configured to perform a task is an image scaling accelerator configurable to perform image scaling on two or more images concurrently. That is, the image scaling accelerator may include multiple scalers that may be configured to perform multiple concurrent scaling tasks. One example of such an image scaler is described in U.S. patent application Ser. No. 15/143,491 filed Apr. 29, 2016.

The VPAC 112 includes eleven nodes: the single task hardware accelerators 202, 204, 208, the dual task hardware accelerator 206, and the six DMA channels 226-236. The hardware thread scheduler 200 includes a hardware task scheduler 210-218 for each hardware accelerator node in the VPAC 112, a DMA hardware task scheduler 226-236 for each channel of the DMA 250 used by the VPAC 112, and two proxy hardware task schedulers 220, 221 for two external nodes, i.e., two software tasks implemented on an external processor. The task schedulers 210-221, 226-236 are connected to a scheduler crossbar 222 that may be configured by various memory mapped registers in the memory mapped registers 224 to chain task schedulers to create threads. In other words, the scheduler crossbar 222 provides for communication of control information between task schedulers assigned to a thread. The scheduler crossbar 222 may be a full crossbar in which any task scheduler can be chained with any other task scheduler or a partial crossbar with more limited chaining capability.

In general, the thread scheduling of the hardware thread scheduler 200 is a consumer/producer model. That is, a thread is a set of tasks with consumer/producer dependencies. A task/node managed by a task scheduler may be a consumer task that consumes data from one or more producer tasks, a producer task that produces data for one or more consumer tasks, or both a consumer task and a producer task. A task scheduler may include one or more producer and/or consumer sockets depending on the type of task of the associated node. For example, if a task scheduler is connected to a node that performs a consumer task that consumes data from one producer task, then the task scheduler may have a single consumer socket. If the consumer task consumes data from more than one producer task, then the task scheduler may have one consumer socket for each producer task.

If a task scheduler is connected a node that performs a producer task that produces data for a single consumer task, then the task scheduler may have a single producer socket. If the producer task produces data for more than one consumer task, then the task scheduler may have one producer socket for each consumer task. If a task scheduler is connected to a node that performs a consumer/producer task, then the task scheduler may have a consumer socket for each producer task producing data for the consumer/producer task and a producer socket for each consumer task consuming data from the consumer/producer task.

In the VPAC 112, the task schedulers 210-218 are depicted as having two consumer sockets and two producer sockets for simplicity. One of ordinary skill in the art will understand that the number of producer and consumer sockets in a task scheduler may vary depending upon the consumption and production properties of the task/node connected to the task scheduler. Each node corresponding a channel of the DMA either executes a task that consumes data, i.e., is a consumer channel programmed to transfer data from shared memory 238 to external memory, or produces data, i.e., is a producer channel programmed to transfer data from external memory to shared memory 238. The DMA task schedulers 232-236 are connected to consumer channels and each includes a single consumer socket. The DMA task schedulers 226-230 are connected to producer channels and each includes a single producer socket.

Each socket of the task schedulers 210-221, 226-236 is connected to the scheduler crossbar 222 by two signals, a pending signal indicating availability of consumable data, and a decrement signal indicating that a block of produced data has been consumed. A pending signal may be referred to as a "pend" signal herein and a decrement signal may be referred to as a "dec" signal herein. A task scheduler sends a pend signal via a producer socket to a consumer socket connected to the producer socket when data is available and receives a dec signal via the producer socket from the connected consumer socket when the produced data has been consumed. A task scheduler sends a dec signal via a consumer socket to a producer socket connected to the consumer socket when the produced data has been consumed and receives a pend signal in the consumer socket from a connected producer socket when data is available for consumption.

The connection of pend and dec signals between producer and consumer sockets of task schedulers to form threads is controlled by the scheduler crossbar 222. Scheduling software executing on the GPP 102 may configure a thread of tasks to be performed on the VPAC 112 by setting control signal values of multiplexers in the scheduler crossbar 222 to "connect" the pend and dec signals of the task schedulers for the desired tasks.

In some embodiments, the scheduler crossbar 222 includes a multiplexer for the incoming pend signal of each consumer socket and a multiplexer for the incoming dec signal of each producer socket. For example, if the task schedulers 210-220, 226-236 include M consumer sockets and N producer sockets, then the scheduler crossbar 222 includes M+N multiplexers. A multiplexer connected to the incoming dec signal of a producer socket includes a single output connected to the incoming dec signal and M inputs, one for each outgoing dec signal of each consumer socket. A multiplexer connected to the incoming pend signal of a consumer socket includes a single output connected to the incoming pend signal and N inputs, one for each outgoing pend signal of each producer socket. Each of the multiplexers is connected to a corresponding control register in the MMR 224 that can be programmed to select one of the multiplexer inputs as the output.

Each of the task schedulers 210-218 is connected to a respective node via various signals. The signals may be, for example, a node initialization signal, an initialization complete acknowledgement signal, a task start signal, a task completion signal, and an end of processing signal. Table 1 provides more detail about each of these signals. In the table, the column labeled "Dir" indicates the direction of the signal with respect to the task scheduler. The end of processing signal is needed as a task may be executed multiple times to process incoming data, e.g., a task may be executed multiple times to process different subsets of a block of video data. The node/task is aware of when all the data has been processed and uses the eop signal to indicate that all the data has been processed and there is no need to execute the task again. Each time the task scheduler receives the task completion signal, the task scheduler will start the task again unless the end of processing signal is received.

TABLE 1

| Signal Name | Dir | Description |
| --- | --- | --- |
| init | out | Initialize node/task |
| init_done | in | Node/task initialization is complete |
| tstart | out | Start task execution |
| tdone | in | Task execution is complete |
| tdone_mask | in | For each Tdone, mask indicates validity of output data. When '0' indicates corresponding output buffer was not generated; when '1' indicates valid output buffer is generated. |
| eop | in | Node processing is complete |

In general, a proxy task scheduler is connected to an external node, e.g., a software implemented task on an external processor, via a pend interrupt or a dec interrupt depending up whether the proxy task scheduler is scheduling consumption of data by the task or production of data by the task. A pend interrupt is used to indicate to the external node/task that data is available for consumption and a dec interrupt is used to indicate to the external node/task that data produced by the external node/task has been consumed. In some embodiments, a proxy task scheduler is also configured to perform task scheduling for channels of the DMA 250 to transfer data between the shared memory 238 and external memory.

If the external task both consumes and produces data, the external task is considered to be two nodes/tasks and two proxy task schedulers are connected to the external processor, one via a dec interrupt and one via a pend interrupt. The two proxy task schedulers 220, 221 are connected to a software task that is both a consumer and a producer. One of the proxy task schedulers 220 is connected to the external processor by a pend interrupt and the other 221 is connected to the external processor by a dec interrupt. Further, each of the proxy task schedulers 220, 221 is connected to the DMA 250 to schedule DMA tasks.

The MMR 224 is configured to store various control and configuration parameters for the hardware thread scheduler 200. The parameters include parameters for configuring and controlling threads and parameters for configuring and controlling the task schedulers 210-221, 226-232. In some embodiments, the MMR 224 includes a thread control register for each of a maximum number of threads that may be executed concurrently on the VPAC 112. Each thread control register corresponds to a particular thread number, e.g., 0, 1, . . . n−1 where n is the maximum number of threads. A thread control register includes an enable/disable bit that may be used to activate or deactivate the corresponding thread. Further, the MMR 224 include a task scheduler control register for each task scheduler 210-220, 226-232. A task scheduler control register includes an enable/disable bit that may be used to activate or deactivate the corresponding task scheduler and a field identifying the thread number to which the task scheduler is assigned.

In such embodiments, the MMR 224 also includes a consumer control register for each consumer socket and a producer control register for each producer socket. A consumer control register includes an enable/disable bit that may be used to activate or deactivate the corresponding consumer socket and the producer select value for the multiplexor connected to the consumer socket. A consumer control register for a consumer socket in a proxy task scheduler also includes a "pend" bit that may be set by the external task to indicate when data is available for consumption.

A producer control register includes an enable/disable bit that may be used to activate or deactivate the corresponding producer socket and the consumer select value for the multiplexor connected to the producer socket. A producer control register for a producer socket in a proxy task scheduler also includes a "dec" bit that may be set by the external task to indicate that a block of data has been consumed.

The MMR 224 also includes a task count register for each proxy task scheduler and producer DMA task scheduler. The task count register is used to specify how many times the task controlled by the task scheduler is to be executed. This information is used by the task scheduler to determine when task processing is complete and eop can be signaled, e.g., the task scheduler may count the number of task starts/completions and signal eop when the task has been completed the number of times specified in the task count register.

The MMR 224 also includes a producer buffer control register and a producer count register for each producer socket. A producer buffer control register includes a buffer depth field specifying the maximum number of blocks of data a producer can have pending for consumption and a producer count register includes a count field that holds the count of how many blocks of data a producer currently has pending for consumption. The value of the buffer depth field depends on the amount of shared memory assigned for storing the produced data blocks and the size of the data blocks. The combination of the maximum buffer depth and the count may be used to prevent buffer overflow and underflow as production and consumption of data may be asynchronous.

Scheduling software executing on the GPP 102 may configure a thread to be executed on the VPAC 200 by writing appropriate values in the registers of the task schedulers to be included in the thread. In particular, the scheduling software may write appropriate producer select values and consumer select values for the sockets of the task schedulers of the tasks to be included in the thread to synchronize the tasks and enable the sockets. The scheduling software may also appropriately set the enable/disable bit in the task scheduler control register of each task scheduler in the thread to enable each task scheduler. The scheduling software may also select a thread number for the thread and write that thread number in the task scheduler register of each task scheduler in the thread. Once a thread is configured, the scheduling software may initiate execution of the thread by appropriately setting the enable/disable bit in the corresponding thread control register to activate the thread.

The scheduling software may configure two or more threads that execute concurrently on the VPAC 200 where each thread is configured as previously described. Each concurrent thread may be configured to include a separate non-overlapping subset of the task schedulers 210-221, 226-236. For example, one concurrent thread may include the task schedulers 210, 212, 214, 232, 234, 236 and another concurrent thread may include the task schedulers 216, 218, 220, 221, 226, 228, 230. Further, the scheduling software may configure a thread on a subset of the task schedulers and start execution of that thread. While the previously configured thread is executing, the scheduler may configure another thread on another subset of the task schedulers and start execution of the thread. The scheduling software may also configure two or more threads and initiate concurrent execution of the configured threads once all are configured.

Figure 3:
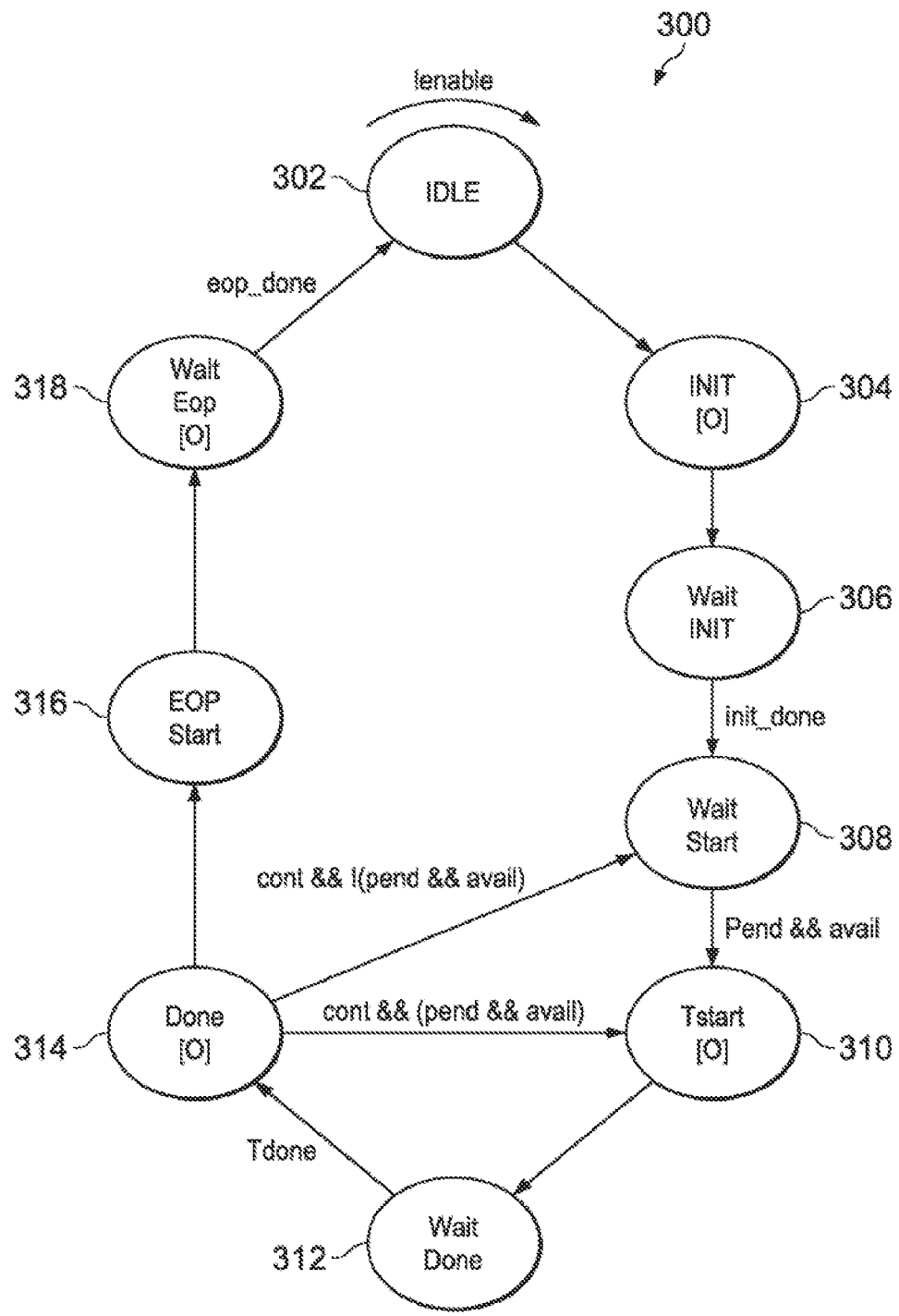
FIG. 3 is a diagram of an example state machine.

FIG. 3 is a diagram of an example state machine 300 illustrating operation of a task scheduler such as a task scheduler 210-218. A task scheduler is in an idle state 100 until enabled by the activation of a thread in which the task scheduler is included. When enabled, the task scheduler enters an initialization state 304 during which the init signal is sent to the corresponding node to cause initialization of the node/task. The task scheduler also sets all of the counters for the enabled producer sockets of the task scheduler to zero and performs any other scheduler initialization needed. The task scheduler then enters a wait state 306 waiting for the node/task to send the init_done signal indicating that initialization is complete.

Once the init_done signal is received, the task scheduler enters another wait state 308 waiting for certain conditions to be met to start execution of the task. More specifically, the task scheduler remains in the wait state 308 until the task scheduler receives a pend signal for all activated consumer sockets of the task scheduler and sufficient buffer space is available in shared memory for all the enabled producer sockets of the task scheduler. The task scheduler may know that sufficient buffer space is available if the counter for the producer socket is less than the specified buffer depth for the producer socket. Once these conditions are met, the task scheduler enters the task start state 310 during which the tstart signal is sent to the task/node to start execution of the task. After sending the tstart signal, the task scheduler enters another wait state 312 to waiting for the task/node to send the tdone signal indicating that task execution is complete.

Once the tdone signal is received, the task scheduler enters a done state 314. While in the done state, the task scheduler sends a pend signal to all consumer sockets connected to the enabled producer sockets of the task scheduler to indicate that data is available. The task scheduler also increments the counter for each of the enabled producer sockets of the task scheduler to indicate that a block of data has been produced to be consumed and decrements the counter of any enabled producer socket that has received a dec signal from the connected consumer socket. The task scheduler also sends a dec signal to all producer sockets connected to the enabled consumer sockets of the task scheduler to indicate that a block of data from each connected producer socket has been consumed.

Finally, the task scheduler determines whether the task is to be executed again (continued) or if processing is complete. If the node/task sent an eop signal along with the tdone signal, then processing is complete and the task scheduler enters the eop start state 316. In the eop start state 316, the task scheduler prepares for the thread end of processing and then enters the wait eop state 318 to wait until all other tasks in the thread reach this state. If the node/task did not send an eop signal, then the task is to be executed again. If the pend signal is high for all enabled consumer sockets of the task scheduler and sufficient buffer space is available in shared memory for all the enabled producer sockets of the task scheduler, the task scheduler will re-enter the task start state 310. Otherwise, the task scheduler will re-enter the wait state 308 to wait for these conditions to be met.

A DMA task scheduler such as a task scheduler 226-236 and a proxy task scheduler such as a task scheduler 220, 221 may operate according to a state machine similar to the state machine 300. One difference is that a DMA task or an external task does not signal tdone or eop. Instead, these task schedulers use the previously mentioned task count register to determine whether or not the task has been executed the desired number of times and enter the eop start state 316 when the task has been executed the desired number of times. In addition, the external task does not send a tdone signal to the proxy task scheduler. Instead, the external task writes to the pend bit of a producer socket of the proxy task scheduler if the external task is a producer task or to the dec bit of a consumer socket of the proxy task scheduler if the external task is consumer task, which the proxy task scheduler treats as the equivalent of a tdone signal.

Figure 4A:
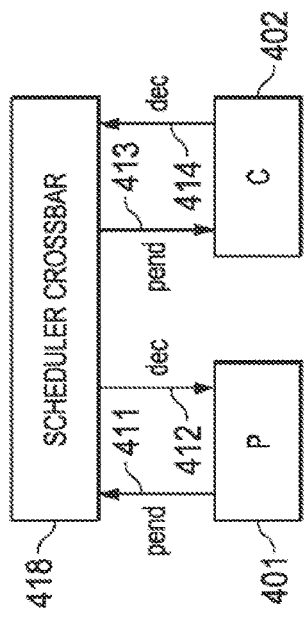
FIGS. 4A and 4B are an example illustrating synchronization between two connected task schedulers in a thread.
Figure 4B:
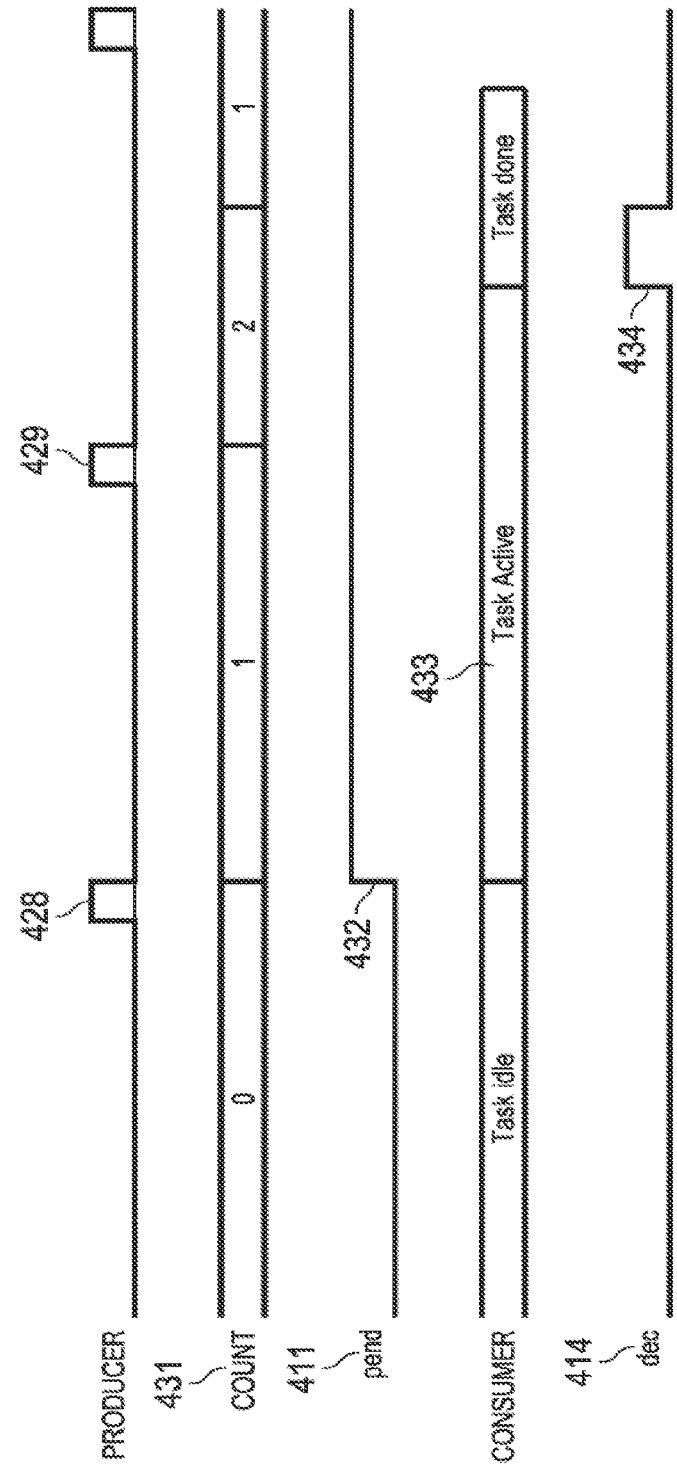

FIGS. 4A and 4B are a simple example illustrating synchronization between two connected task schedulers in a thread. FIG. 4A is a block diagram of a simple system and FIG. 4B is a partial timing diagram illustrating the synchronization timing. Referring first to the block diagram of FIG. 4A, the pend signal 411 and dec signal 412 of a producer socket of the task scheduler 401 are connected to the pend signal 413 and dec signal 414 of a consumer socket of the task scheduler 402 via the scheduler crossbar 418. When the task corresponding to task scheduler 401 is started by the task scheduler 401, the task produces a block of data and signals 428 the task scheduler 401 that the task is complete.

The task scheduler 401 then asserts 432 the pend signal 411 to indicate to the task scheduler 402 that data is available for consumption and also increments 431 the counter for the producer socket. The task scheduler 402 receives the pend signal and starts 433 the corresponding task to process the available data. While the consumer task is processing the initial block of data, the task scheduler 401 again starts the corresponding task to produce another block of data. The task produces another block of data and signals 429 the task scheduler 401 that the task is complete. The task scheduler 401 then increments 431 the counter for the producer socket. Note that the new block of data is produced before the consuming task has finished processing the initial block of data and thus the counter has a value of two as none of the produced blocks of data have been consumed at this point in time.

Sometime after the new block of data is produced, the task corresponding to the task scheduler 402 completes processing of the initial block of data and signals the task scheduler 402 that the task is complete. The task scheduler 402 then asserts 434 the dec signal 414 to indicate to the task scheduler 401 that the initial block of data has been processed. The task scheduler 401 receives the dec signal and decrements the counter for the producer socket. At this point in time, the counter has a value of one as there is another block of data available for processing by the task corresponding to the task scheduler 402. Note that the pend signal 411 is still high 432, thus indicating to the task scheduler 402 that there is more data available to be processed. While not specifically shown in the timing diagram, because the pend signal 411 is still high, the task scheduler 402 will start the corresponding task again to process the new block of data and assert the dec signal 414 when the processing is complete. The task scheduler 401 will not lower the pend signal until the counter value is zero and the corresponding task asserts the end of processing signal.

Figure 5A:
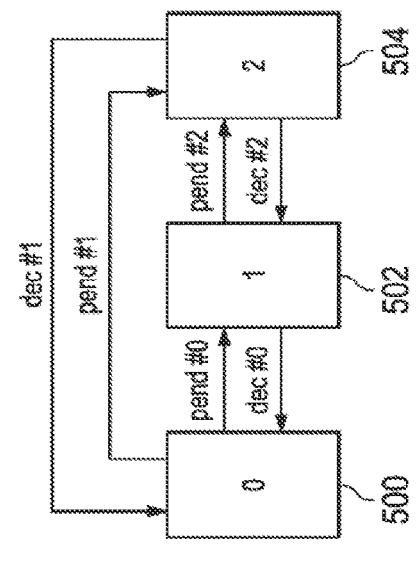
FIGS. 5A-5D are an example illustrating synchronization between three connected task schedulers in a thread.
Figure 5B:
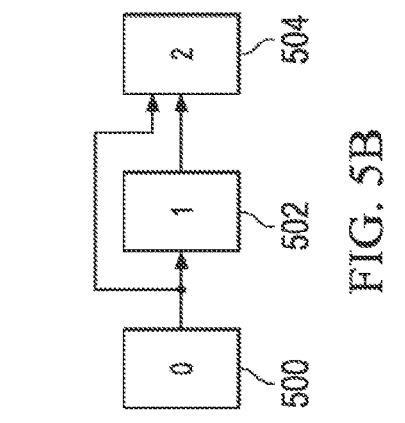
Figure 5C:
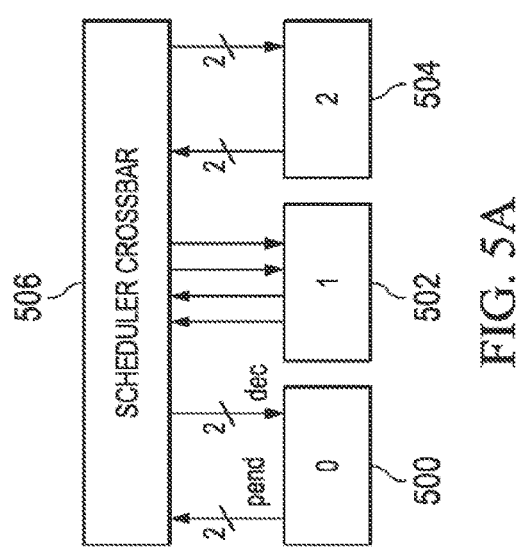
Figure 5D:
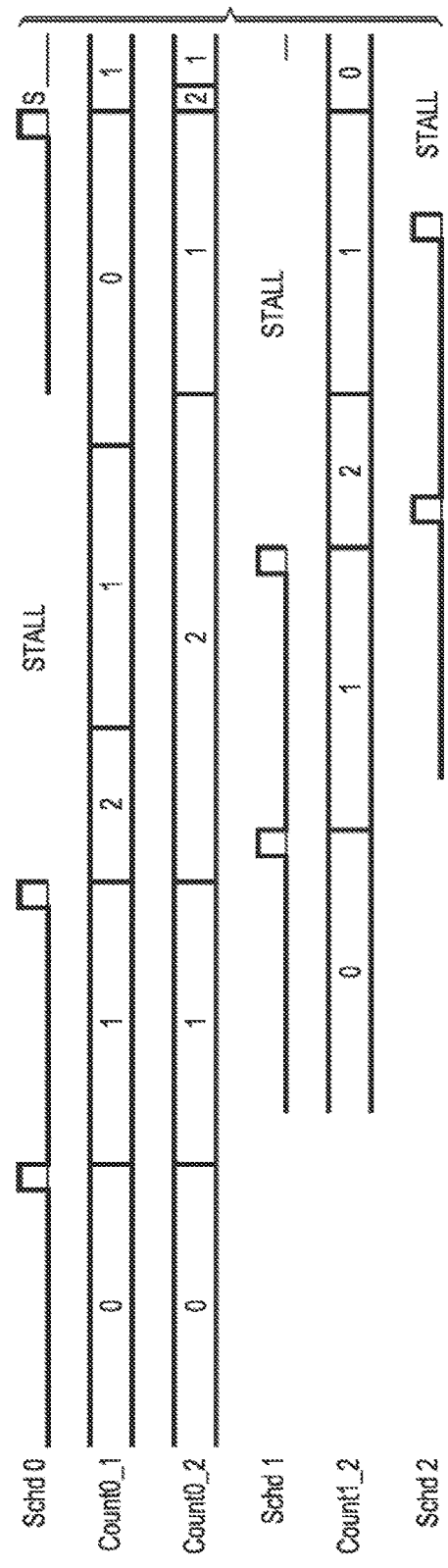

FIGS. 5A-5D are a simple example illustrating synchronization between three connected task schedulers in a thread. FIG. 5A-5C are block diagrams illustrating aspects of a simple system and FIG. 5D is a partial timing diagram illustrating the synchronization timing. Referring first to FIG. 5A, the pend and dec signals of one producer socket of the task scheduler 500 are connected to the pend and dec signals of a consumer socket of the task scheduler 502 via the scheduler crossbar 506. In addition, the pend and dec signals of another producer socket of the task scheduler 500 are connected to the pend and dec signals of a consumer socket of the task scheduler 504 via the scheduler crossbar 506. Further, the pend and dec signals of a producer socket of the task scheduler 502 are connected to the pend and dec signals of a consumer socket of the task scheduler 504 via the scheduler crossbar 506.

FIG. 5B illustrates the data flow between the task schedulers 500, 502, 504. The task corresponding to the task scheduler 500 produces a block of data for the task corresponding to the task scheduler 502 and for the task corresponding the task scheduler 504. In addition, the task corresponding to the task scheduler 502 produces a block of data for the task scheduler 504.

In the timing diagram of FIG. 5D, Schd 0 is the task scheduler 500, Schd 1 is the task scheduler 502, and Schd 2 is the task scheduler 504. Referring now to FIGS. 5C and 5D together, when the task corresponding to the task scheduler 500 is started by the task scheduler 500, the task produces a block of data and signals the task scheduler 500 that the task is complete. The task scheduler 500 then asserts a pend signal (Pend #0) to indicate to the task scheduler 502 that data is available for consumption and also increments the counter (Count0_1) for the producer socket connected to the task scheduler 502. The task scheduler 500 also asserts a pend signal (Pend #1) to indicate to the task scheduler 504 that data is available for consumption and increments the counter (Count0_2) for the producer socket connected to the task scheduler 504.

The task scheduler 502 receives the pend signal (Pend #0) from the task scheduler 500 and starts the corresponding task to process the available data. The task scheduler 504 receives the pend signal (Pend #1) from the task scheduler 500 but cannot start the corresponding task as that task also needs a block of data from the task corresponding to the task scheduler 502. While the task corresponding to the task scheduler 502 is processing the initial block of data and the task scheduler 504 waits for data from that task, the task scheduler 500 again starts the corresponding task to produce another block of data. The task produces another block of data and signals the task scheduler 500 that the task is complete. The task scheduler 500 then increments the counters (Count0_1, Count0_2) for both producer sockets. Note that the new block of data is produced before the task corresponding to the task scheduler 502 has finished processing the initial block of data and before the task corresponding to the task scheduler 503 has processed the initial block of data and thus both counters have a value of two as none of the produced blocks of data have been consumed at this point in time.

Sometime after the new block of data is produced, the task corresponding to the task scheduler 502 completes processing of the initial block of data and signals the task scheduler 502 that the task is complete. The task scheduler 502 then asserts a dec signal (Dec #0) to indicate to the task scheduler 500 that the initial block of data has been processed. The task scheduler 500 receives the dec signal and decrements the counter (Count0_1) for the connected producer socket. At this point in time, the counter has a value of one as there is another block of data available for processing by the task corresponding to the task scheduler 502.

The task scheduler 502 also asserts a pend signal (Pend #2) to indicate to the task scheduler 504 that data is available for consumption and also increments the counter (Count1_2) for the connected producer socket. Because the pend signal (Pend #0) from the task scheduler 500 is still high and more data is available, the task scheduler 502 starts the corresponding task again to process the available data to generate another block of data for the task corresponding to the task scheduler 504. When the task is done, the task scheduler 502 asserts a dec signal (Dec #0) to indicate to the task scheduler 500 that another block of data has been processed. The task scheduler 500 receives the dec signal and decrements the counter (Count0_1) for the connected producer socket. At this point in time, the counter has a value of zero as no more data has been produced. The task scheduler 502 also increments the counter (Count1_2) for the producer socket connected to the task scheduler 504 as another block of data is available for the task corresponding to the task scheduler 504. At this point in time, the counter has a value of two as the task corresponding to the task scheduler 504 has not yet completed processing of the initial block of data from the task corresponding to the task scheduler 502.

When the task scheduler 504 receives the pend signal (Pend #2) from the task scheduler 502, the task scheduler 504 starts the corresponding task as both consumer sockets have a high pend signal and blocks of data are available for both consumer sockets. The task completes processing of both blocks of data and signal the task scheduler 504 that the task is complete. The task scheduler 504 then asserts a dec signal (Dec #1) to indicate to the task scheduler 500 that the initial block of data has been processed. The task scheduler 500 receives the dec signal and decrements the counter (Count0_2) for the connected producer socket. At this point in time, the counter has a value of 1 as there is another block of data available for processing by the task corresponding to the task scheduler 504.

The task scheduler 504 also asserts a dec signal (Dec #2) to indicate to the task scheduler 502 that the initial block of data from the corresponding task has been processed. The task scheduler 502 receives the dec signal and decrements the counter (Count1_2) for the connected producer socket. At this point in time, the counter has a value of one as there is another block of data available for processing by the task corresponding to the task scheduler 504.

Because the pend signals (Pend #0, Pend #1)) from the task scheduler 500 and the task scheduler 502 are still high and more data is available, the task scheduler 504 starts the corresponding task again to process the available data. When the task is done, the task scheduler 504 asserts a dec signal (Dec #1) to indicate to the task scheduler 500 that another block of data has been processed and a dec signal (Dec #2) to indicate to the task scheduler 502 that another block of data has been processed.

Figure 6:
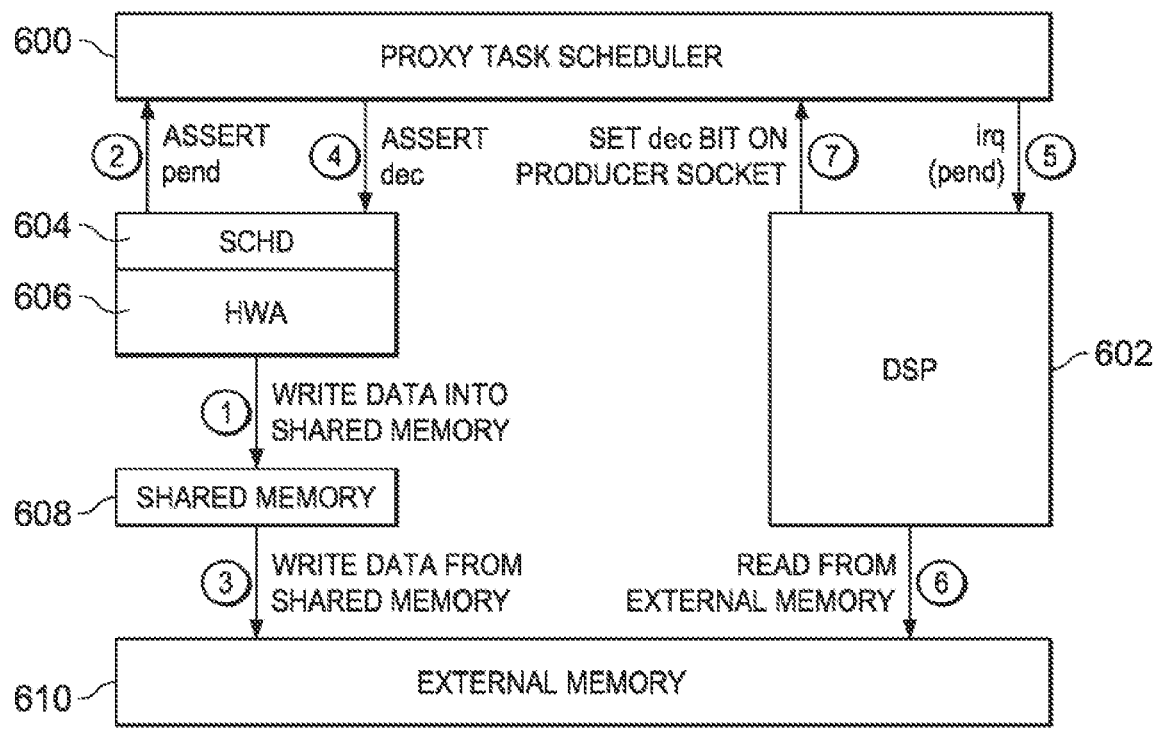
FIG. 6 is a block diagram illustrating synchronization between a proxy task scheduler for a consumer task and a task scheduler.
Figure 7:
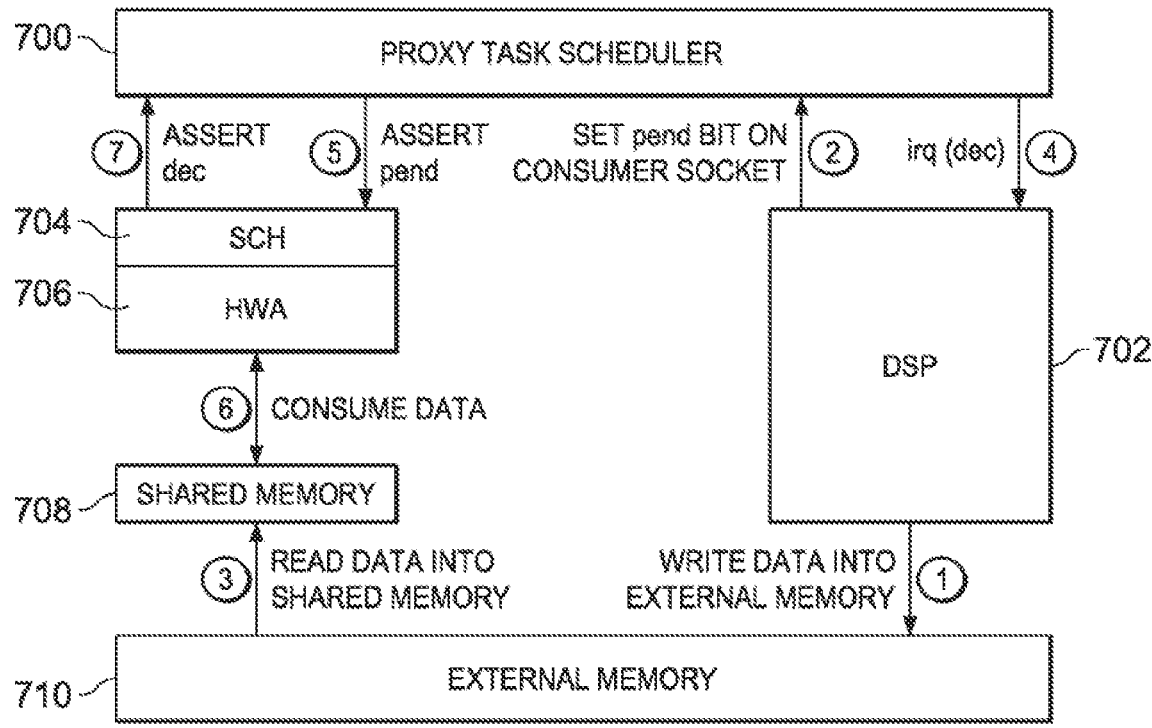
FIG. 7 is a block diagram illustrating synchronization between a proxy task scheduler for a producer task and a task scheduler.
Figure 8:
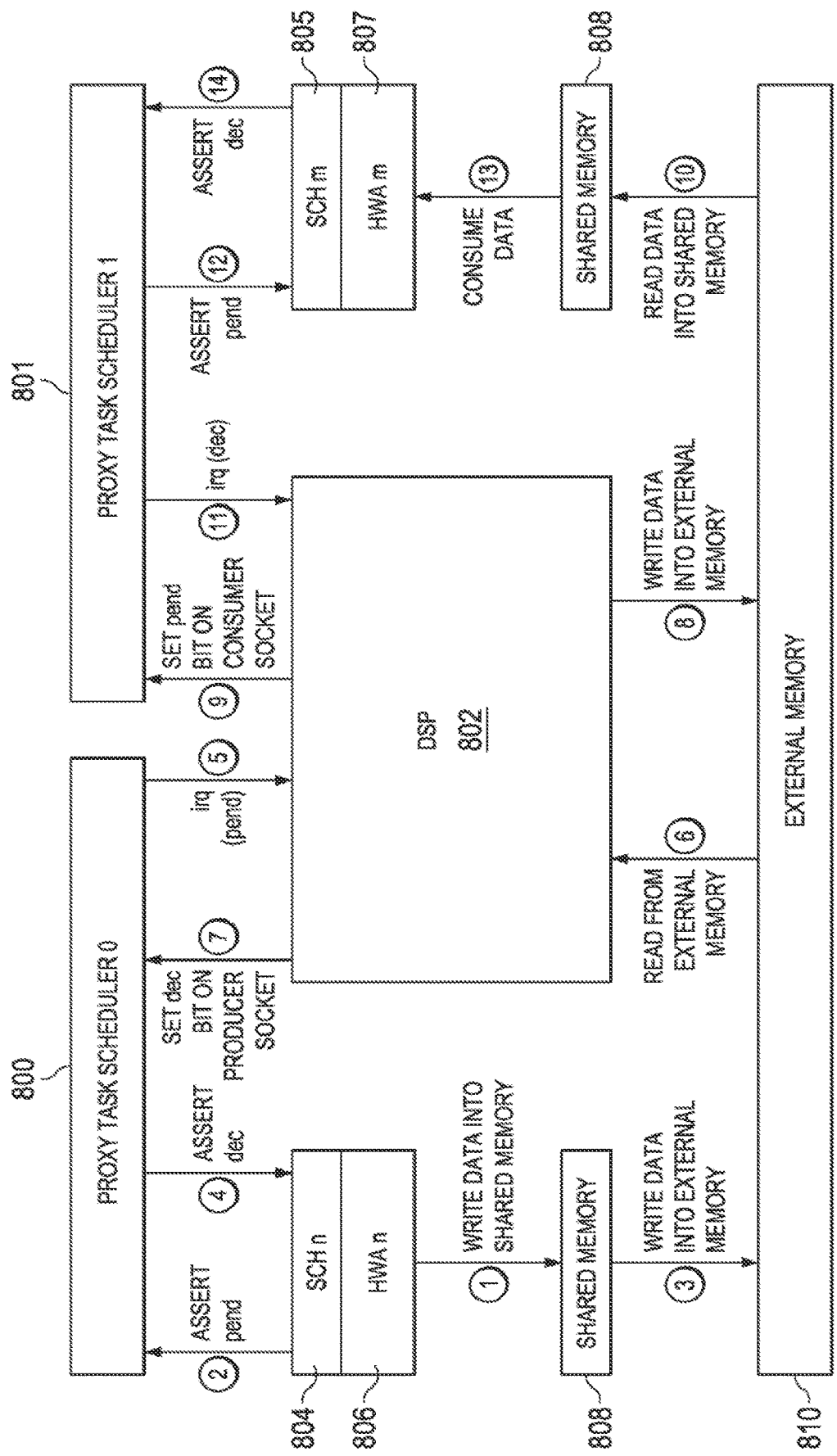
FIG. 8 is a block diagram illustrating synchronization when the task executing on a processor consumes data produced by one hardware accelerator to produce data for another hardware accelerator.

FIGS. 6-8 are block diagrams illustrating synchronization between various configurations of proxy task schedulers and task schedulers for hardware accelerators. As previously mentioned herein, a proxy task scheduler may include circuitry for communicating with a DMA to move data between external memory and shared memory.

The block diagram of FIG. 6 illustrates synchronization between a proxy task scheduler 600 for a consumer task performed on a digital signal processor (DSP) 602 and a task scheduler 604 for a hardware accelerator 606 producing data for the consumer task. The proxy task scheduler 600 includes a producer socket that is connected to the DSP 600 by a pend interrupt signal (irq (pend)). The proxy task scheduler 600 also includes a consumer socket that is connected to a producer socket of the task scheduler 604 by pend and dec signals.

The synchronization operates as follows. The task scheduler 604 starts the task performed by the hardware accelerator 606 and the task produces a block of data that is written into the shared memory 608. The task signals the task scheduler 604 that the task is complete and the task scheduler 604 asserts the pend signal to indicate to the proxy task scheduler 600 that data is available. The task scheduler 604 also increments the counter for the producer socket. The proxy task scheduler 600 schedules a DMA transfer to move the block of data from the shared memory 608 to external memory 610. Once the DMA transfer is complete, the proxy task scheduler 600 asserts the dec signal to the producer socket of the task scheduler 604 to indicate that the block of data has been moved out of the shared memory 608. The task scheduler 604 receives the dec signal and decrements the counter of the producer socket.

The proxy task scheduler 600 also asserts the pend interrupt to the DSP 602 to indicate that a block of data is available in the external memory 610 for processing and increments the counter of the producer socket connected to the DSP 602. The task executing on the DSP 602 reads the block of data from the external memory 610. When the task has completed processing the data, the task causes the counter of the producer socket in the proxy task scheduler 600 to be decremented by writing to the dec bit of the producer socket.

The block diagram of FIG. 7 illustrates synchronization between a proxy task scheduler 700 for a producer task performed on a digital signal processor (DSP) 702 and a task scheduler 704 for a hardware accelerator 706 consuming the data from the producer task. The proxy task scheduler 700 includes a consumer socket that is connected to the DSP 700 by a dec interrupt signal (irq (dec)). The proxy task scheduler 700 also includes a producer socket that is connected to a consumer socket of the task scheduler 704 by pend and dec signals.

The synchronization operates as follows. The task executing on the DSP 702 writes a block of data into the external memory 710 and sets the pend bit on the connected consumer socket in the proxy task scheduler 700 to indicate that a block of data is available. The proxy task scheduler 700 schedules a DMA transfer to move the block of data from the external memory 710 to the shared memory 708. Once the DMA transfer is complete, the proxy task scheduler 700 signals the dec interrupt to the DSP 702 to indicate that the block of data has been moved out of the external memory 710.

The proxy task scheduler 700 also asserts the pend signal to the task scheduler 704 to indicate that a block of data is available in the shared memory 708 for processing and increments the counter of the producer socket. The task scheduler 704 starts execution of the hardware accelerator 706 which consumes the block of data in the shared memory 708. When the hardware accelerator 706 signals the task scheduler 704 that the task is complete, the task scheduler 704 asserts the dec signal to the producer socket of the proxy task scheduler 700 to indicate that the block of data has been consumed. The proxy task scheduler 700 then decrements the counter of the producer socket.

The block diagram of FIG. 8 illustrates synchronization when the task executing on a digital signal processor (DSP) 802 consumes data produced by one hardware accelerator, HWA n 806, to produce data for another hardware accelerator, HWA m 807. The proxy task scheduler 0 800 for the consumer portion of the task includes a producer socket connected to the DSP 800 by a pend interrupt signal (irq (pend)) and a consumer socket that is connected by pend and dec signals to a producer socket of the task scheduler n 804 for the hardware accelerator n 806. The proxy task scheduler 1 801 for the producer portion of the task includes a consumer socket connected to the DSP 800 by a dec interrupt signal (irq (dec)) and a producer socket that is connected by pend and dec signals to a consumer socket of the task scheduler m 805 for the hardware accelerator m 807.

The synchronization operates as follows. The task scheduler n 804 starts the task performed by the hardware accelerator n 806 and the task produces a block of data that is written into the shared memory 808. The task signals the task scheduler n 804 that the task is complete and the task scheduler n 804 asserts the pend signal to indicate to the proxy task scheduler 0 800 that data is available. The task scheduler n 804 also increments the counter for the producer socket. The proxy task scheduler 0 800 schedules a DMA transfer to move the block of data from the shared memory 808 to external memory 810. Once the DMA transfer is complete, the proxy task scheduler 0 800 asserts the dec signal to the producer socket of the task scheduler n 804 to indicate that the block of data has been moved out of the shared memory 808. The task scheduler 0 804 receives the dec signal and decrements the counter of the producer socket.

The proxy task scheduler 0 800 also asserts the pend interrupt to the DSP 802 to indicate that a block of data is available in the external memory 810 for processing and increments the counter of the producer socket connected to the DSP 802. The task executing on the DSP 802 reads the block of data from the external memory 810. When the task has completed processing the incoming data, the task causes the counter of the producer socket in the proxy task scheduler 0 800 to be decremented by writing to the dec bit of the producer socket, stores a block of data in the external memory 810 for consumption by the hardware accelerator m 807, and sets the pend bit on the connected consumer socket in the proxy task scheduler 1 801 to indicate that the block of data is available.

The proxy task scheduler 1 801 schedules a DMA transfer to move the block of data from the external memory 810 to the shared memory 808. Once the DMA transfer is complete, the proxy task scheduler 1 801 signals the dec interrupt to the DSP 802 to indicate that the block of data has been moved out of the external memory 810.

The proxy task scheduler 1 801 also asserts the pend signal to the task scheduler m 805 to indicate that a block of data is available in the shared memory 808 for processing and increments the counter of the producer socket. The task scheduler m 805 starts execution of the hardware accelerator m 807 which consumes the block of data in the shared memory 808. When the hardware accelerator m 807 signals the task scheduler m 805 that the task is complete, the task scheduler m 805 asserts the dec signal to the producer socket of the proxy task scheduler 1 801 to indicate that the block of data has been consumed. The proxy task scheduler 1 801 then decrements the counter of the producer socket.

FIG. 9 is a flow diagram of a method for configuring and executing a thread of tasks on a hardware thread scheduler such as the hardware thread scheduler 200 of FIG. 2. The method may be implemented by scheduling software executed on a host processor, e.g., the GPP 102 of FIG. 1. The method is described using the hardware thread scheduler 200 as an example. One of ordinary skill in the art will understand embodiments of the method for other embodiments of a hardware thread scheduler.

Initially, the scheduling software connects 900 the task schedulers for the tasks to be included in the thread in data processing order to create the thread. The task schedulers may be all of the task schedulers of the hardware thread scheduler or a subset of the task schedulers. Further, the task schedulers in a thread may include one or more task schedulers for hardware accelerators, one or more proxy task schedulers, and/or one or more DMA task schedulers. The task schedulers are connected by setting control signal values of multiplexers in the scheduler crossbar 222 to connect pend and dec signals of the tasks as needed for production and consumption of data. The initial task in the thread is a producer task that produces data and triggers the execution of subsequent tasks, e.g., a DMA task.

The scheduling software also configures 902 parameters of each task scheduler in the thread. For example, the scheduling software may store the thread identifier in the task scheduler control register of each of the task schedulers in the thread, enable producer and consumer sockets in the task schedulers, set buffer depths, and specify task counts for any proxy and DMA task schedulers in the thread. After the parameters are configured, the scheduling software enables 904 each task scheduler in the thread by setting the enable/disable bits in the respective task scheduler control registers.

Once all the task schedulers in the thread are enabled, the scheduling software enables 906 the thread by setting the enable/disable bit in the thread control register of the thread. Enabling the thread causes the hardware thread scheduler 200 to initiate the execution of the task schedulers in the thread. After the thread is enabled, the scheduling software waits 908 for the end of thread signal from the hardware thread scheduler indicating the thread has completed execution.

FIG. 10 is a flow diagram of a method for executing a configured thread of tasks on a hardware thread scheduler such as the hardware thread scheduler 200 of FIG. 2. Configuration of a thread of tasks is described in reference to the method of FIG. 9. The tasks in the configured thread may correspond to all of the task schedulers of the hardware thread scheduler or a subset of the task schedulers. Further, the task schedulers in the configured thread may include one or more task schedulers for hardware accelerators, one or more proxy task schedulers, and/or one or more DMA task schedulers. The method is described using the hardware thread scheduler 200 as an example. One of ordinary skill in the art will understand embodiments of the method for other embodiments of a hardware thread scheduler.

The hardware thread scheduler 200 initiates 1002 execution of the tasks in the thread responsive to enabling the thread by the scheduling software on the GPP 102 of FIG. 1. That is, when the thread is enabled, all of the task schedulers in the thread begin execution. As previously described, once initialized, a task scheduler waits until data is available for all consumer sockets of the task scheduler and/or buffer space is available for all producer sockets of the task scheduler before starting execution of the corresponding task. The initial task in the thread is a producer task that produces data and triggers the execution of subsequent tasks, e.g., a DMA task.

Once the initial task begins executing, the tasks in the thread are executed responsive to the connected pend and dec signals without intervention by the hardware thread scheduler 200. The hardware thread scheduler 200 monitors 1004 the task schedulers in the thread to determine when all of the task schedulers have reached the end of processing state. Once all the task schedulers have reached the end of processing state, the hardware thread scheduler 200 signals 1006 end of thread to the scheduling software and disables the thread.

FIG. 11 is a flow diagram of a method for executing concurrent threads on a hardware thread scheduler such as the hardware thread scheduler 200 of FIG. 2. The method may be implemented by scheduling software executed on a host processor, e.g., the GPP 102 of FIG. 1. The method is described using the hardware thread scheduler 200 as an example. One of ordinary skill in the art will understand embodiments of the method for other embodiments of a hardware thread scheduler.

Initially, the scheduling software configures 1100 a thread on a subset of task schedulers in the hardware thread scheduler and enables the thread 1102. Configuration and enablement of a thread are previously described herein. While the thread is executing, the scheduling software configures 1104 another thread on a different non-overlapping subset of the task schedulers of the hardware thread scheduler and enables the thread 1106. The scheduling software then waits 1108 for end of thread signals from the hardware thread scheduler indicating that the threads have completed execution.

In some embodiments, the scheduling software may configure both threads before enabling either one.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which a scheduler crossbar of multiplexers allows any consumer socket to be connected to any producer socket. One of ordinary skill in the art will understand embodiments in which some consumer and producer sockets may be directly connected to reduce complexity of the scheduler crossbar. For example, some DMA task scheduler producer sockets and consumer sockets may be directly connected to consumer and producer sockets of hardware task schedulers for hardware accelerators.

In another example, embodiments have been described herein in which a proxy scheduler schedules to a software task on a processor external to the VPAC. One of ordinary skill in the art will understand embodiments in which a proxy task scheduler is connected to a hardware accelerator external to the VPAC.

In another example, embodiments have been described herein in which the DMA is included in the VPAC. One of ordinary skill in the art will understand embodiments in which the DMA is external to the VPAC.

In another example, embodiments have been described herein in which the shared memory is included in the VPAC. One of ordinary skill in the art will understand embodiments in which the shared memory is external to the VPAC.

In another example, embodiments have been described herein in which a hardware thread scheduler includes one or more proxy hardware task schedulers. One of ordinary skill in the art will understand embodiments without a proxy hardware task scheduler.

In another example, one of ordinary skill in the art will understand embodiments that include enhanced data synchronization techniques such as those described in U.S. patent application Ser. No. 15/269,957, filed Sep. 19, 2016, which is incorporated by reference herein.

In another example, embodiments have been described herein in which an external task sets dec or pend bits in a proxy task scheduler socket that are interpreted by the task scheduler as the equivalent of a tdone signal. One of ordinary skill in the art will understand embodiments in which an external task may indicate to the proxy task scheduler that the task is complete. For example, the socket connected to external task may have a tdone bit that can be set by the external task. Similarly, rather than having the proxy task scheduler count the number of times the external task is executed to determine when processing is complete, the external task may set an eop bit in the connected socket to indicate end or processing.

In another example, embodiments have been described herein in which pend and dec signals and pend and dec interrupts are used to communicate availability of consumable data and consumption of data. One of ordinary skill in the art will understand embodiments in which these "messages" between consumers and producers are enhanced to communicate more information. For example, the producer count may be sent along with a pend message and a decrement count may be sent along with a dec message.

In another example, embodiments have been described herein in which a crossbar of multiplexers is used to connect the pend and dec signals of the task schedulers. One of ordinary skill in the art will understand embodiments in which other configurable interconnection logic may be used. For example, the signaling/messaging may be mapped to a transfer protocol, e.g., Open Core Protocol, and the interconnect logic of that protocol may used to pass the signals/messages.

In another example, embodiments have been described herein in reference to ADAS. One of ordinary skill in the art will understand embodiments for computer vision applications other than ADAS, such as, for example, industrial applications, robotics, and drones.

In another example, embodiments have been described herein in reference to block based data processing for computer vision. One of ordinary skill in the art will understand embodiments for other types of block based data processing in which multiple hardware accelerators are used. Examples of such block based data processing include image processing, video coding, machine learning and deep learning.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A device comprising:
   data processing nodes including a first data processing node associated with a first hardware accelerator, and a second data processing node associated with a second hardware accelerator; and
   a hardware thread scheduler including:
      a plurality of internal hardware task schedulers, each including at least one of a producer socket and a consumer socket, each of the plurality of internal hardware task schedulers coupled to a different one of the data processing nodes; and
      a hardware scheduler crossbar configured to be coupled to the producer sockets of the plurality of internal hardware task schedulers via respective pending signals and configured to be coupled to the consumer sockets of the plurality of internal hardware task schedulers via respective decrement signals, in which each pending signal indicates availability of consumable data, and each decrement signal indicates that a block of produced data has been consumed:

wherein the hardware thread scheduler is configured to:
configure a first subset of the plurality of internal hardware task schedulers to execute a first thread of tasks, including couple the first subset of the internal hardware task schedulers, via pending and decrement signals, in a first data processing order;
configure a second subset of the plurality of internal hardware task schedulers to execute a second thread of tasks at least partially overlapping execution of the first thread of tasks, including couple the second subset of the internal hardware task schedulers, via pending and decrement signals, in a second data processing order;
initiate execution of the first thread of tasks including a first task associated with the first data processing node and a second task associated with the second data processing node;
initiate execution of the second thread of tasks including a third task associated with a third data processing node of the data processing nodes and a fourth task associated with an external data processing node that is external to the first, second, and third data processing nodes;
determine a completion of the execution of the first task and the second task; and
communicate a signal indicating the completion of the execution of the first task and the second task.

2. The device of claim 1, wherein at least one of the data processing nodes is a channel of a direct memory access component.

3. The device of claim 1, wherein the external data processing node is a digital signal processor.

4. The device of claim 1, wherein the first thread of tasks is configured to start execution when all input and output data dependencies of the first thread of tasks are satisfied.

5. The device of claim 1, wherein a first internal hardware task scheduler of the first subset of internal hardware task schedulers is configured to produce a first block of data when the first task is executed and a second internal hardware task scheduler of the first subset of internal hardware task schedulers is configured to consume a second block of data produced by the first task when the first task is executed, wherein production and consumption of the first block of data and the second block of data by the first task and the second task, respectively is asynchronous.

6. The device of claim 5, wherein the first block of data and the second block of data are the same.

7. The device of claim 5, wherein:
the first internal hardware task scheduler is configured to increment, after producing the first block of data, a count indicating that the first block of data is available for consumption.

8. The device of claim 1, wherein the hardware thread scheduler is further configured to:
after initiating execution of the first thread of tasks, monitor the internal hardware task schedulers of the first subset of internal hardware task schedulers to determine when all of the internal hardware task schedulers of the first subset of internal hardware task schedulers have reached an end of processing state.

9. The device of claim 1, wherein, to configure the internal hardware task schedulers of the first subset of internal hardware task schedulers, the hardware thread scheduler is further configured to set control values in the hardware scheduler crossbar to initiate pending and decrement signals to connect the internal hardware task schedulers of the first subset of internal hardware task schedulers in the first data processing order.

10. The device of claim 1, wherein the internal hardware task scheduler of the external data processing node is a proxy task scheduler.

11. A method for scheduling execution of threads of tasks on a hardware thread scheduler in a device, the method comprising:
configuring a first subset of hardware task schedulers of a plurality of hardware task schedulers of the hardware thread scheduler to execute a first thread of tasks via a hardware scheduler crossbar, the first thread of tasks including a first task on a first data processing node and a second task on a second data processing node;
initiating execution of the first thread of tasks by the first subset of hardware task schedulers, wherein each hardware task scheduler of the first subset of hardware task schedulers includes at least one of a producer socket that sends to the hardware scheduler crossbar a pending signal indicating availability of consumable data, and a consumer socket that sends to the hardware scheduler crossbar a decrement signal indicating that a block of produced data has been consumed;
configuring a second subset of hardware task schedulers of the plurality of hardware task schedulers to execute a second thread of tasks that is different from the first thread of tasks, a first hardware task scheduler of the second subset of hardware task schedulers having at least a producer socket and a second hardware task scheduler of the second subset of the hardware task schedulers having a consumer socket, the configuring of the second subset of hardware task schedulers including:
sending a pending signal of the producer socket of the first hardware task scheduler via the hardware scheduler crossbar to the consumer socket of the second hardware task scheduler; and
sending a decrement signal of the consumer socket of the second hardware task scheduler via the hardware scheduler crossbar to the producer socket of the first hardware task scheduler, in response to the hardware scheduler crossbar receiving the pending signal; and
initiating execution of the second thread of tasks by the second subset of hardware task schedulers including executing a third task associated with a third data processing node and executing a fourth task associated with a fourth data processing node that is external to first, second, and third data processing nodes.

12. The method of claim 11, wherein the first data processing node is a hardware accelerator, and the second data processing node is a channel of a direct memory access component.

13. The method of claim 12, further comprising:
counting production and consumption of data blocks, wherein the first task of the first thread of tasks produces the data blocks and the second task of the first thread of tasks consumes the data blocks.

14. The method of claim 13, wherein:
the production is asynchronous production.

15. The method of claim 13, wherein the counting comprises:
incrementing a count each time the first task produces a data block, the incrementing performed by the respective hardware task scheduler of the first task; and
decrementing the count each time a data block produced by the first task is consumed by the second task, the decrementing performed by the respective hardware task scheduler of the first task.

16. The method of claim 11, further comprising starting execution of each task in at least one of the first thread of tasks and the second thread of tasks in response to completion of all input and output data dependencies of each task in the corresponding thread of tasks.

17. The method of claim 11, further comprises:
connecting the hardware task schedulers of the first subset of hardware task schedulers in data processing order; and
configuring parameters of the hardware task schedulers of the first subset of hardware task schedulers.

18. The method of claim 17, wherein the parameters include a parameter associating the first subset of hardware task schedulers with the first thread of tasks.

19. The method of claim 11, wherein the configuring of the first subset of hardware task schedulers and the configuring of the second subset of hardware task schedulers include configuring the first and second subsets of hardware task schedulers to execute their respective first and second threads of tasks concurrently.

20. The method of claim 11, wherein the configuring of the first subset of hardware task schedulers includes connecting functionally adjacent hardware task schedulers via pending and decrement signals in the first data processing order to execute the first thread of tasks.

* * * * *